UNITED STATES PATENT OFFICE.

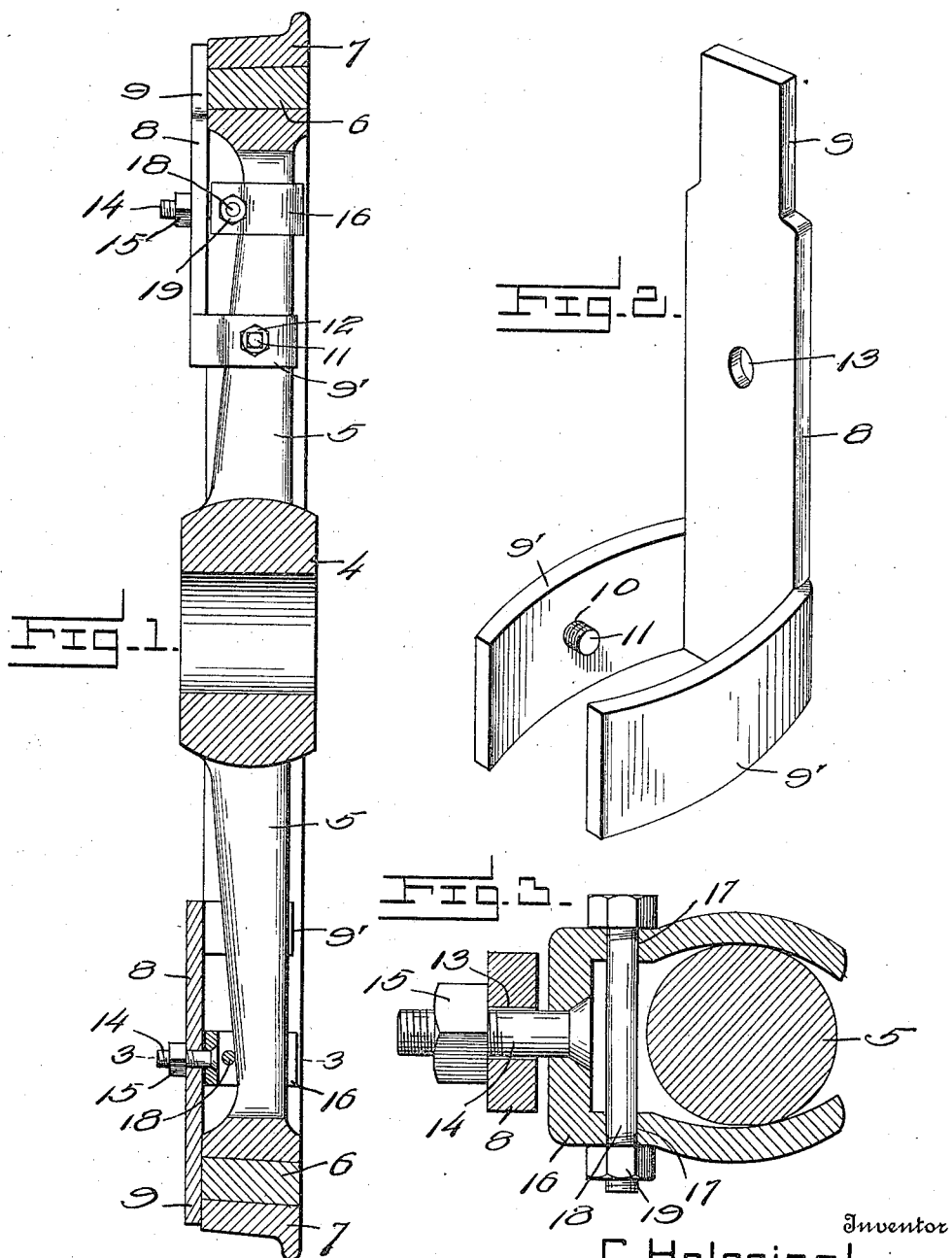

CLARENCE HELREIGEL, OF PITTSTON, PENNSYLVANIA.

TIRE-CLAMPING DEVICE.

1,059,870.  Specification of Letters Patent.  Patented Apr. 22, 1913.

Application filed October 15, 1912.  Serial No. 725,853.

*To all whom it may concern:*

Be it known that I, CLARENCE HELREIGEL, a citizen of the United States, residing at Pittston, in the county of Luzerne and State of Pennsylvania, have invented certain new and useful Improvements in Tire-Clamping Devices, of which the following is a specification.

My invention relates to means adapted to be temporarily mounted upon the wheel of an engine, to retain the tire in place, should the same become loose.

An important object of this invention is to provide a device of simple construction, which may be quickly and easily mounted upon the spoke of the wheel so that a portion thereof will engage the tire, and prevent the same from coming off of the wheel or rim.

A further object of this invention is to provide novel adjustable means for moving the holding element of the device into proper clamping engagement with the tire.

A further object of my invention is to provide a device of the above mentioned character, which may be readily mounted upon wheels of different sizes without injuring or in any way changing the construction of the wheel.

A further object of this invention is to provide means of the above mentioned character, which are simple in construction, strong, durable and cheap to manufacture.

Further objects and advantages of this invention will be apparent during the course of the following description.

In the accompanying drawings forming a part of this specification and in which like numerals are employed to designate like parts throughout the same, Figure 1 is a central transverse sectional view through an engine wheel, showing my devices mounted thereon, one device being shown in section and the other in elevation, Fig. 2 is a perspective view of the holding element or body portion of the device and associated elements, and, Fig. 3 is an enlarged cross-sectional view taken on line 3—3 of Fig. 1.

It is well known that almost all engine wheels are equipped with tires, which may be removed when they are worn out. These tires are of course normally held in place upon the wheels by suitable means. It often happens, during the travel of an engine from one station to another or when the engine is at a considerable distance from a place of repair, such as a round house or shop, that the tire on a wheel will work loose. When the tires work loose, as above stated, they must be at once securely attached to the wheels, or serious accidents will result therefrom. As far as I am aware, no reliable and simple means have been provided which are adapted to be carried in the engine cab or the like, and may be quickly and easily connected with the wheels, to properly hold the tires in place until the engine can reach the next point of repair, when the tires will be permanently secured upon the wheels and the temporary holding means removed.

I have constructed a device which may be readily mounted upon the spoke of the engine wheel, with a portion thereof extending outwardly to engage the tire, to hold the same in place upon the wheel.

My device is adapted to be mounted upon wheels of different sizes and may be quickly and easily attached to the same. In practice I have found it advantageous to mount two of the devices upon the wheel, in diametrically opposite relation. Any suitable number of the devices may be mounted upon a wheel, as will be required by the condition of the rim.

In the drawings wherein is illustrated a preferred embodiment of my invention, the numeral 4 designates the hub of an engine wheel, to which are connected spokes 5, carrying the usual rim 6. This rim is permanently connected with the outer ends of the spokes and ordinarily welded therewith. The outer surface or periphery of the rim 6 is beveled or tapered outwardly, as shown, to receive a tire 7. By this construction the tire is placed upon the rim and taken off of the same from the outer side of the wheel.

Any suitable means may be provided to normally retain the tire in place upon the rim and permit of the removal of the tire when the same is worn out.

Each of my holding devices comprises a body portion or holding element 8, having its outer end preferably reduced, as shown at 9. Rigidly connected with the inner end of the body portion 8 and preferably formed integral therewith are curved spaced jaws 9' which are adapted to straddle the spoke 5. One of these jaws is provided with a screw-threaded opening 10, for receiving a clamping bolt 11, carrying a locking nut 12.

The body portion 8 is provided between its ends with an opening 13, for receiving an adjusting or clamping bolt 14. This bolt carries upon its outer screw-threaded portion a nut 15, as shown. The bolt 14 is connected with the transverse portion of a U-shaped bracket 16, which is adapted to straddle the spoke 5, as shown. The arms of this U-shaped bracket have their outer portions suitably curved or dished, to conform to the curvature of the spoke and securely hold the same when moved into clamping engagement therewith. The arms of the U-shaped bracket 16 are provided near their outer ends or adjacent the transverse portion of the bracket, with openings 17, to receive a transverse clamping bolt 18, carrying a nut 19. Attention is called to the fact that the bolt 18 may permanently remain in place, the nut 19 being suitably unscrewed to permit the bracket 16 being slipped over the spoke 5, subsequent to which the nut 18 may be screwed up to draw the arms of the bracket into proper clamping engagement with the spoke.

In the use of the device, two of the same are preferably arranged diametrically opposite each other on the wheel. The holding or body portions 8 are radially disposed or extend parallel with the spokes, with their outer extensions 9 disposed in engagement with or in the path of travel of the tire 7 as shown. The jaws 9' are disposed upon opposite sides of the spoke 5 and the clamping bolt 11 is manipulated to properly clamp the spoke against the opposite jaw, thus serving to hold the device in place. The locking nut is then turned to prevent accidental rotation of the clamping bolt. The bracket 16 straddles the spoke 5 between the jaws 9' and the rim 6, as shown. This bracket is readily slipped about the spoke and is subsequently firmly clamped upon the same by proper manipulation of the nut 19. To draw the extension 9 of the body portion or clamping element 8 adjacent the rim 6 or into engagement with the tire 7, the nut 15 is turned, thus securing any desired degree of clamping engagement between the parts.

It is to be understood that the form of my invention herewith shown and described is to be taken as a preferred example of the same, and that certain changes in the shape, size, and arrangement of parts may be resorted to without departing from the spirit of my invention or the scope of the subjoined claims.

Having thus fully described my invention what I claim is:—

1. A device to be mounted upon the spoke of a wheel to retain the tire in place thereon, comprising a radially disposed element, an approximately U-shaped element to straddle the spoke, means to clamp the approximately U-shaped element to the spoke, and adjustable connecting means between the radially disposed element and the approximately U-shaped element, whereby the former may be moved toward and away from the latter.

2. A device of the character described, to be mounted upon a wheel for retaining the tire in place thereon, comprising an element adapted to prevent the displacement of the tire, means to connect the element with the wheel, and additional adjusting connecting means between the element and wheel whereby the element may be brought into different degrees of clamping engagement with the tire.

3. A device to be mounted upon a wheel to prevent the tire from coming off of the rim, comprising a body portion to engage the tire, means to connect the body portion with the spoke, and adjustable means disposed between the connecting means and the rim of the wheel to serve as additional connecting means between the body portion and the spoke, whereby the body portion may be brought into proper clamping engagement with the tire.

4. A device for preventing the tire of a wheel from moving off of the rim, comprising a radially disposed holding element, a pair of spaced jaws mounted upon the inner end of the holding element and adapted to be disposed upon opposite sides of the spoke, clamping means carried by one of the jaws, a bracket disposed outwardly of the jaws and adapted to straddle the spoke, clamping means carried by the bracket, and connecting means between the bracket and the holding element, whereby the outer end of the holding element may be brought into proper clamping engagement with the tire.

5. A device for preventing the tire of a wheel from moving off of the rim, comprising a radially disposed body portion having its outer end arranged to be engaged by the rim, spaced jaws connected with the inner end of the body portion and disposed upon opposite sides of the spoke, means to securely hold the jaws in place upon the spoke, a substantially U-shaped bracket disposed outwardly of the jaws and straddling the spoke, a transverse clamping bolt disposed upon the outer side of the spoke and serving as adjustable connecting means between the arms of the substantially U-shaped bracket and an adjusting bolt connecting the U-shaped bracket with the body portion.

6. A device to be mounted upon the spoke of a wheel to retain the tire in place thereon, comprising a radially disposed element, an approximately U-shaped element to straddle the spoke of the wheel, a transverse bolt to draw the arms of the approximately U-shaped element into proper clamping engagement with the spoke, and connecting means between the radially disposed element and the approximately U-shaped element.

In testimony whereof I affix my signature in presence of two witnesses.

CLARENCE HELREIGEL.

Witnesses:
HILDA KOERNER,
HARRY BUTKIEWICZ.

---

Copies of this patent may be obtained for five cents each, by addressing the "Commissioner of Patents, Washington, D. C."